H. TIDEMAN.
ANIMAL CLEANING DEVICE.
APPLICATION FILED SEPT. 23, 1910.
1,048,233.
Patented Dec. 24, 1912.
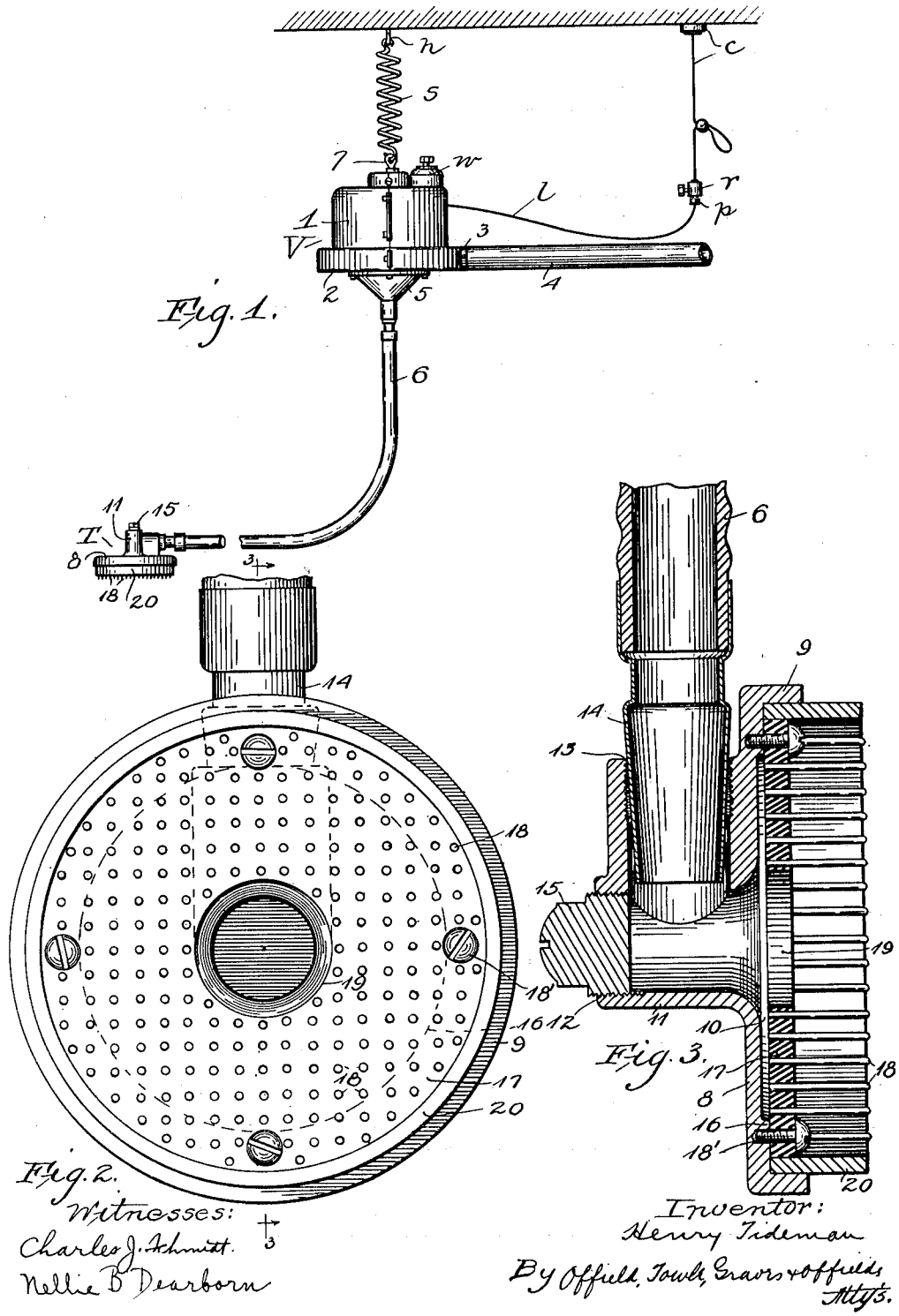

UNITED STATES PATENT OFFICE.

HENRY TIDEMAN, OF MENOMINEE, MICHIGAN.

ANIMAL-CLEANING DEVICE.

1,048,233. Specification of Letters Patent. Patented Dec. 24, 1912.

Application filed September 23, 1910. Serial No. 583,421.

*To all whom it may concern:*

Be it known that I, HENRY TIDEMAN, a resident of Menominee, in the county of Menominee and State of Michigan, have invented certain new and useful Improvements in Animal-Cleaning Devices, of which the following is a full, clear, and precise specification.

My invention relates to animal cleaning devices, particularly to such devices controlled by suction.

Among the important objects of my invention are to produce a compact, simple and efficient suction outfit to be used in connection with animal cleaning tools, such outfit being adapted to be easily handled and readily supported in any suitable place where it is to be used; and to provide a cleaning tool in the form which will perform the functions of both curry-comb and brush and which is of a construction particularly adaptable for use in vacuum or suction cleaning systems.

The nature of my invention and the various features thereof will be readily understood from the following specification and by reference to the accompanying drawing, in which drawing—

Figure 1 is a view showing the various parts of the cleaning outfit supported and connected ready for use, Fig. 2 is an under side view of the cleaning tool, and Fig. 3 is a sectional view taken on plane 3—3, Fig. 2.

Referring to Fig. 1, a vacuum producing device V of suitable design is adapted to be suspended through the agency of a spring $s$ from the ceiling of the stall in which the animal to be cleaned is kept, the vacuum producing device being preferably electrically driven, so that it can derive its driving power upon connection of a plug $p$ with a socket $r$ connected in the usual manner with an electric light circuit $c$. The vacuum producing device shown comprises a cylindrical body part 1 having the cylindrical enlargement 2 forming a fan chamber having the tangential outlet 3 for connecting with a hose or other conductor 4, which in practice is preferably extended out through a window adjacent the stall. A conical inlet cap 5 leading to the fan chamber is adapted to be detachably engaged by a hose 6 leading to the cleaning tool T. The top of the body part 1 of the vacuum device has an eye 7 for engaging the spring $s$, the other end of the spring being adapted for engagement with hooks $h$ provided at various suitable points along the ceiling of the barn and preferably adjacent the various electric power outlets, so that connection can readily be made with the electric current supply through the plug $p$ and the leads $l$ leading from the vacuum device to the plug, a switch $w$ being preferably mounted on the vacuum device to control the current flow to the fan motor of said device. The various frame parts of the vacuum producing device are preferably made of aluminum, so that the device is very light and readily transportable from one suspending hook to another, and the device being thus suspended preferably over the animal to be cleaned so as not to interfere in any way with cleaning operations. Being thus suspended over the animal the outlet conductor 4 can be readily inserted through a window and the dirt, dust and other particles will find their way to the outside of the barn through the shortest path and without having to pass any turns or corners, as will be the case if the vacuum producing device were set in one end of the barn and the cleaning tool hose 6 and the outlet hose 4 were of great length. By suspending the vacuum producing device all hose connections are away from the floor and thus in no danger of being stepped on by the animals or by the attendants. The flexible spring suspension also allows the device to be used over a considerable field.

In Figs. 2 and 3 I have shown a preferred form of cleaning tool which will perform both the functions of a curry comb and a brush. In the ordinary process of cleaning a horse both a curry comb and a brush are used. The curry comb is usually of sheet metal devoid of flexibility and will at times irritate and hurt the animal. In my device I produce flexibility, so that the animal can at no time be irritated or injured, and that the rubbing of the cleaning device will create a healthy condition. As shown, the tool comprises a main frame 8 preferably of aluminum and which may be circular, as shown, or of any other convenient contour. This frame has at its periphery a flange 9 forming a pocket 10, and extending in the opposite direction from the center of the frame is the annular lug 11 communicating with the pocket 10. The frame with its flange and lug can of course be readily stamped integral from sheet aluminum or other metal. The lug 11 has an axial outlet 12 and a radial outlet 13, either one of which may be engaged by the plug 14 provided at the end of the hose 6 leading from the vacuum producing device 1, and both outlets being threaded to receive a shut-off plug 15. If it is desired to use the radial outlet, as shown in the drawing, the plug 15 is screwed into the axial end of the lug, while if the axial outlet is desired to be used the plug 14 is inserted in this axial end and the plug 15 screwed into the radial inlet 13. Adjacent the flange 9 the frame 8 is provided with the annular boss 16, against which seats the disk 17 to be held in place by screws 18', this disk being preferably of soft rubber and supporting a plurality of bristles 18. These bristles are preferably of stiff material, such as steel, and are of comparatively large diameter, their outer ends being rounded. The rubber base 17 is quite thick in order to stiffen the bristles sufficiently so that they can be used to curry the animal to loosen the dirt, the mounting of the bristles, however, being sufficiently flexible so that they can be used in the capacity of a brush without in any way hurting or irritating the animal, the application of the flexible steel bristles with the rounded ends serving rather to soothe the animal and to create a healthy condition of the skin. The disk 17 has the central opening 19 registering with the interior of lug 11, through which opening the dust, dandruff, and other dirt particles and the loosened hair will be drawn by the suction to be carried through hose 6 through the window and to the exterior of the barn. The boss 16 keeps the inner part of the disk 17 removed from the frame 8 in order to allow sufficient flexure of the disk to follow the various irregularities of the animal over which the device is being operated. The bristles are sufficiently spaced apart to prevent clogging or accumulation of the products of cleaning, particularly hairs, and to allow these products to readily find their way to and through the opening 19, this opening 19 being of sufficient size to well accommodate all such products of cleaning. In order to confine the suction to the area adjacent the bristles a flexible ring 20 of leather or other suitable material is interposed and clamped between the flange 9 and the periphery of the disk 17 to surround the bristles, thus preventing escape of any dust but confining the dust to be acted upon by the suction and to be carried through opening 19 into the outlet hose.

The cleaning device described above, even without the suction attachment, is more efficient and desirable than the old-fashioned curry-comb, this old-fashioned curry comb being of rigid metal with sharp ends which irritate, scratch and hurt the animal, whereas in the device of my invention the bristles are yieldingly and flexibly mounted and have rounded ends, the application of the device giving a sort of massage treatment which is very beneficial to the skin. Of course with the suction attachment the device is much more efficient, in that the dust and other cleaning particles are removed immediately upon being loosened. The brush part can be readily removed at any time from the holder or frame and can be replaced by a brush having the ordinary animal bristles to be used with or without suction. The suction attachment can be either with the top or the side of the frame, as would be the most convenient, and the method of suspending the suction producing device, as hereinbefore described, renders the manipulation and operation of the cleaning tool very easy and reliable. The cleaning products can be blown through a window or into a suitable receptacle and will not accumulate in the barn, as is the case with the old fashioned curry combs. The outlet hose can also be directly applied to the animal to clean by the operation of blowing, or can be used for other cleaning purposes about the barn. Any other suction controlled cleaning tool or device can be applied to the end of suction hose 6, or to the end of exhaust hose 4. Further changes and modifications are possible, which would also come within the scope of my invention, and I do not therefore desire to be limited to the precise construction and arrangement shown, and I claim the following:

An animal cleaning device comprising a metallic body part in the form of a disk having a peripheral flange extending in one direction and an extension extending in the opposite direction to form a passage way communicating with the space surrounded by said flange, said passage way having a radial outlet and an axial outlet each adaptable for detachable connection with a hose communicating with a suction producing device, a plate of flexible material secured to said disk within said flange and having an opening communicating with said passage way, bristles extending from said plate to said opening, and a flexible rubber wall secured between said plate and flange and extending outwardly to surround said bristles.

In witness whereof, I hereunto subscribe my name this 15th day of September, A. D. 1910.

HENRY TIDEMAN.

Witnesses:
L. JACKMAN,
S. McGOWAN.